United States Patent
Bareau et al.

(10) Patent No.: US 8,747,601 B2
(45) Date of Patent: Jun. 10, 2014

(54) SOLID IMAGING OBJECTIVE AND ASSEMBLY TECHNIQUE FOR SMALL SCALE SENSOR APPLICATIONS

(75) Inventors: Jane L. Bareau, Needham, MA (US); James D. Milks, Stamford, CT (US); Nidia A. Alvez, Wolcott, CT (US); Teresa M. Lupien, Stamford, CT (US)

(73) Assignee: Gyrus ACMI, Inc., Southborough, MA (US)

( * ) Notice: Subject to any disclaimer, the term of this patent is extended or adjusted under 35 U.S.C. 154(b) by 0 days.

(21) Appl. No.: 13/487,835

(22) Filed: Jun. 4, 2012

(65) Prior Publication Data

US 2012/0247650 A1  Oct. 4, 2012

Related U.S. Application Data

(62) Division of application No. 12/861,419, filed on Aug. 23, 2010, now Pat. No. 8,218,254.

(51) Int. Cl.
*G02B 7/02* (2006.01)
*G02B 23/24* (2006.01)

(52) U.S. Cl.
CPC ............ *G02B 23/2423* (2013.01); *G02B 7/033* (2013.01); *G02B 7/021* (2013.01); *G02B 7/025* (2013.01); *Y10S 359/90* (2013.01)
USPC ........................... 156/272.2; 156/99; 359/900

(58) Field of Classification Search
CPC .......... G02B 7/00; G02B 7/021; G02B 7/025; G02B 7/001; G02B 7/003; G02B 7/005; B29D 11/00

USPC ......... 156/272.2, 99; 359/811, 819, 822, 642, 359/900

See application file for complete search history.

(56) References Cited

U.S. PATENT DOCUMENTS

| | | | | |
|---|---|---|---|---|
| 4,815,833 A | * | 3/1989 | Zobel et al. | 359/726 |
| 4,902,115 A | * | 2/1990 | Takahashi | 359/362 |
| 5,142,410 A | * | 8/1992 | Ono et al. | 359/435 |

(Continued)

FOREIGN PATENT DOCUMENTS

| EP | 574734 A1 | * 12/1993 | G02B 6/30 |
|---|---|---|---|
| JP | 2004-061763 A | 2/2004 | |

(Continued)

OTHER PUBLICATIONS

SU 1394191 English Abstract.*

(Continued)

*Primary Examiner* — Richard Crispino
*Assistant Examiner* — Elizabeth Royston
(74) *Attorney, Agent, or Firm* — Scully, Scott, Murphy & Presser, P.C.

(57) ABSTRACT

An imaging optic comprising a first combination element comprised of at least two individual lens elements, aligned with each other along an optical axis and adhered to each other, a second combination element comprised of at least one individual lens element and an aperture disposed between the first and second combination elements, the surfaces of the imaging optic having less than about 3 minutes tilt relative to the optical axis and less than about 0.005 mm de-center relative to the optical axis. A method of making the imaging optic and an endoscope comprising the imaging optic.

26 Claims, 6 Drawing Sheets

(56) References Cited

U.S. PATENT DOCUMENTS

| | | | |
|---|---|---|---|
| 5,175,650 A | 12/1992 | Takayama et al. | |
| 6,263,133 B1 * | 7/2001 | Hamm | 385/33 |
| 6,847,480 B2 * | 1/2005 | Steenblik et al. | 359/368 |
| 7,054,069 B1 * | 5/2006 | Gupta | 359/649 |
| 7,180,686 B2 | 2/2007 | Kato | |
| 7,224,469 B2 | 5/2007 | Harned et al. | |
| 7,570,438 B2 * | 8/2009 | McKinley | 359/726 |
| 7,715,129 B2 | 5/2010 | Neely et al. | |
| 7,738,180 B2 | 6/2010 | Igarashi | |
| 7,746,566 B2 | 6/2010 | Mizusawa | |
| 2004/0233542 A1 * | 11/2004 | Yamaguchi et al. | 359/642 |
| 2007/0032169 A1 * | 2/2007 | Neely et al. | 451/5 |
| 2008/0249367 A1 | 10/2008 | Miyano | |
| 2008/0252997 A1 | 10/2008 | Duckett | |

FOREIGN PATENT DOCUMENTS

| | | |
|---|---|---|
| JP | 2004-337346 A | 12/2004 |
| JP | 2008-262193 A | 10/2008 |
| SU | 1394191 * | 5/1988 |

OTHER PUBLICATIONS

International Search Report and Written Opinion mailed Mar. 28, 2012 in corresponding European Patent Application No. PCT/US2011/048390.

Milby, E. and Burge, J. "Centration of Optical Elements", Proc. SPIE vol. 8126 (2011).

"Laser Alignment and Assembly Station: Model LAS-001 User Manual P/N. 900100", Opto-Alignment Technology, Rochester, N.Y., Rev. B (1998).

Kumler, J. and Neer, M. "Alignment Technique for Optical Assemblies", Coastal Optical Systems Inc, West Palm Beach, FL (2004).

United States Official Action mailed Feb. 7, 2012 in parent case, U.S. Appl. No. 12/861,419.

* cited by examiner

SOLID IMAGING OBJECTIVE AND ASSEMBLY TECHNIQUE FOR SMALL SCALE SENSOR APPLICATIONS

CROSS REFERENCE TO RELATED APPLICATION

This application is a divisional of U.S. patent application Ser. No. 12/861,419, filed Aug. 23, 2010 the entire content and disclosure of which is incorporated herein by reference.

FIELD OF THE INVENTION

The present invention relates generally to imaging optics and methods of making imaging optics and more particularly to imaging optics and methods of making imaging optics on a small scale.

BACKGROUND OF THE INVENTION

As sensors become increasingly small, there is a need to produce imaging optics on a comparably small scale. The traditional approach to building lens assemblies for small scale imaging optics is to stack lens elements in a lens cell with spacers and an aperture. The alignment of the individual lenses is entirely dependent on the lens fabrication tolerances and the mechanical tolerances of the lens cell and spacers.

De-center and tilt of the lens elements are the largest contributors to performance degradation in small scale imaging objectives. As lens assemblies shrink in size, the mechanical tolerances used to fabricate the lens and lens cell do not, making the impact of the tolerances on image quality more substantial. As the size of the lenses become sufficiently small, the system becomes inefficient to manufacture because of a high yield loss.

Figure 1:
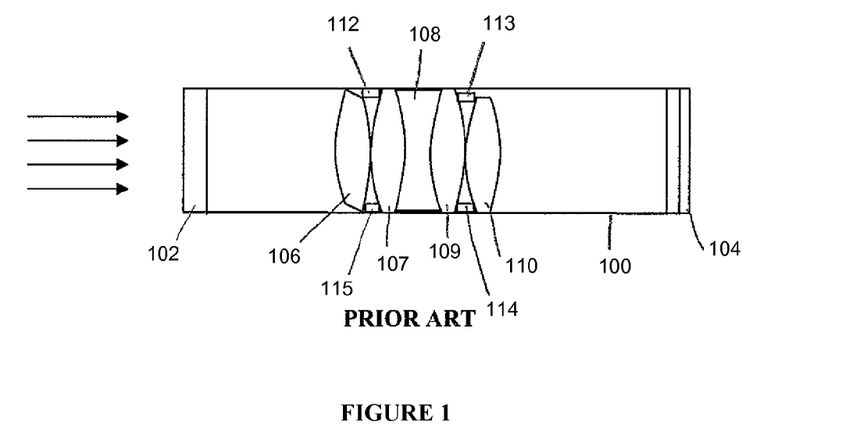
FIG. 1 is an exemplary diagram of a prior art optic.

FIG. 1 is illustrative of the shortcomings found in prior imaging optics implementing several lens elements. Prior imaging optics assemblies are made of individual lenses stacked in a lens cell with mechanical spacers. For these systems, the final lens element of the stack is typically held in place by applying epoxy between the edge of the lens and the inside surface of the lens cell. The alignment of the lenses is determined by the mechanical tolerances of the lens cell, the mechanical tolerances of the spacers and fabrication tolerances of the lenses themselves. As the size of the lenses, lens cells and spacers becomes smaller, at some point the fabrication tolerances can no longer be reduced. At such small sizes the error in each mechanical dimension becomes a greater percentage of overall dimension than previously and the potential for misalignment increases, as described below.

A simplified lens cell 100 is shown, which can be a lens cell which is used in any small optic application, having a window element 102 on one end and an image capturing device 104 on the other end. Only a few lens elements are shown for exemplary purposes, but the number of lens elements can extend from one end of the lens cell 100 to the other. The arrows to the left of the window element 102 are representative of light waves entering lens cell 100. As an example, five lens elements are shown, 106, 107, 108, 109 and 110 in other examples more lens elements could be included. An aperture and spacers could also be added. Spacers 112, 113, 114 and 115 are placed between the lens elements to maintain stability and provide structure for convex surfaces. Since lens cell 100 is of a small diameter, in the range of less than 1 mm, some of the lens elements 106, 107, 108, 109 and 110 cannot be manufactured to exacting standards. The inability to manufacture lens elements to exacting standards results in lens elements 110 being the incorrect size and having its center misaligned with the centers of lens elements 107, 108 and 109. Lens 110 is too small for lens cell 100, as seen by the space remaining above lens 110. Lens 106 is also indicative of a manufacturing defect and is tilting at an incorrect angle, as seen at the top and bottom of lens cell 100 where the outer edges of lens 106 are not sitting flush with the interior of lens cell 100. This tilting and misalignment results in loss of image quality.

What is desired is a small scale imaging objective which can be manufactured efficiently, does not depend on the mechanical tolerances of individual lens elements and will provide good image quality.

SUMMARY OF THE INVENTION

The present invention provides an imaging optic. The imaging optic comprises a first combination element comprised of at least two individual lens elements, aligned with each other along an optical axis and adhered to each other, a second combination element comprised of at least one individual lens element and an aperture disposed between the first and second combination elements, the surfaces of the resulting imaging optic (both embedded and external) having less than about 3 minutes tilt relative to the optical axis and less than about 0.005 mm de-center relative to the optical axis.

The present invention also provides a method of making an imaging optic. The method of making the imaging optic comprising the steps of securing a first individual lens element in a holder, directing one or more beams of light through the first individual lens element, aligning the first individual lens element with the optical axis of the one or more beams of light, securing a second individual lens element in the holder, directing the one or more beams of light through the first individual lens element and the second individual lens element, aligning the one or more beams of light from the first individual lens element with the one or more beams of light from the second individual lens element, placing the first individual lens element and the second individual lens element in a first aligned position, and adhering the first individual lens element to the second individual lens element in the first aligned position, forming a first combination element.

The present invention also provides an endoscope. The endoscope comprises an operation portion, and an insertion portion, the insertion portion including an imaging optic, the imaging optic comprising a first combination element comprised of at least two individual lens elements, aligned with each other along an optical axis and adhered to each other, a second combination element comprised of at least one individual lens element and an aperture disposed between the first and second combination elements, the surfaces of the resulting imaging optic (both embedded and external) having less than about 3 minutes tilt relative to the optical axis and less than about 0.005 mm de-center relative to the optical axis.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

Figure 2:
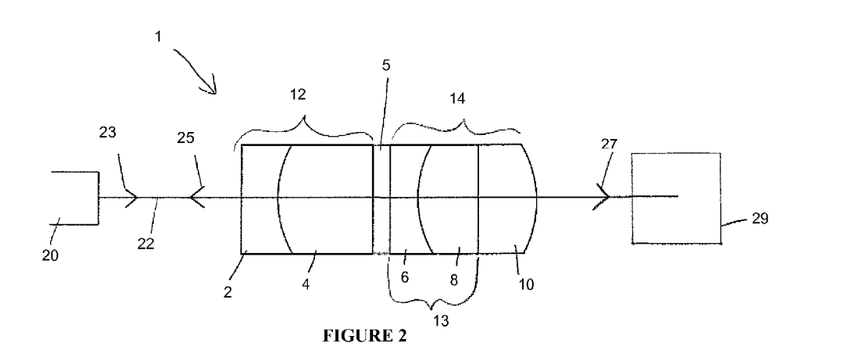
FIG. 2 is an exemplary diagram of the inventive imaging optic.

An inventive solution is presented to the need for an imaging optic and method of making an imaging optic on a small scale while retaining good optical qualities. The system is characterized by its precision and size. FIG. 2 is an exemplary diagram of the inventive imaging optic and is the result of the inventive method.

As shown in FIG. 2, an assembled imaging optic 1 is shown, which was assembled by the inventive method. The method of making the imaging optic comprises several steps. To begin, a first individual lens 2 element is placed on a holder. Each of the individual elements discussed herein can have two powered surfaces, one powered surface and one flat surface or two flat surfaces. The first individual lens element 2, like all individual lens elements described herein, can be composed of any suitable glass or plastic material. The first individual lens element 2 can be secured in the holder, which can be a precision V-block or any other holder suitable to support, with minimal or no movement, a lens element. In one embodiment, the first individual lens element 2 can first be secured or adhered to a first rod which is also placed in the holder. The first rod can aid in handling the first individual lens element 2 and can provide support for the first individual lens element 2 throughout the method. The first rod can be composed of glass or any other suitable material, including plastic.

Once the first individual lens element 2 is secured, a source of one or more beams of light 20 directs one or more beams of light 22 in the optical axis through the first individual lens element 2. The source of the one or more beams of light 20 can be a laser source which can produce one or many laser beams. The one or many laser beams can be created as a pattern or image, or in a random configuration. In one embodiment of the aligning process, to align the first individual lens element 2 with the optical axis, so that the first individual lens element 2 is centered and at the correct angle, the first individual lens element 2 is manipulated so that the one or more beams of light 22 reflect back onto the source of the one or more beams of light 20. In another embodiment of the alignment process, to align the first individual lens element 2 with the optical axis, so that the first individual lens element 2 is centered and at the correct angle, the first individual lens element 2 is manipulated so that the one or more beams of light 22 pass through the first individual lens element and fall on a reference surface 29. The position of the one or more beams of light 22 can be aligned so that they are coincident with a predetermined pattern on reference surface 29. As one example of the many possible configurations, the one or more beams of light 22 can be in a cross-hair image, which can then be aligned so that it is coincident with a cross-hair image on reference surface 29.

This manipulation can be done in any suitable manner, including a manual manipulation by a human user or an automated manipulation. If the manipulation is done in an automated fashion, a machine could be programmed to move each individual lens element until the one or more beams of light 22 reflect back onto the source of the one or more beams of light 20, getting closer to fully aligned until a predetermined error limit is reached.

If automated manipulation of individual lens elements is used a machine can be programmed to secure individual lens relative in the holder. To aid in this, the machine can have robotic parts capable of picking up and manipulating individual lens elements. The machine would first pick up the indicated individual lens element and secure it in the holder. The machine would direct one or more beams of light coming from the light source through the individual lens element by manipulating the position of the individual lens element. The machine would continue to manipulate the position of the individual lens element putting the individual lens element into better and better alignment with the optical axis of the light source. The machine would include several sensors which would measure the alignment of the individual lens element to the optical axis after every movement until the misalignment is below a predetermined error threshold. Once the sensors determine that the individual lens element is sufficiently aligned, the machine would then secure another individual lens element and align it in the same fashion until the misalignment is below a predetermined error threshold and adhere the two individual lens elements together.

In one embodiment of the alignment process, the one or more beams of light 22 will pass through the first individual lens element 2 and reflect back onto the source of the one or more beams of light 20. Exit arrow 23 on the one or more beams of light 22 represent the one or more beams of light 22 as they exit the source of the one or more beams of light 22. Reflection arrow 25 represents the one or more beams of light 22 as it is reflected back to the source of the one or more beams of light 20 after contacting the individual lens elements.

Once the first individual lens element 2 is manipulated so that the one or more beams of light 22 reflects back onto the source of the one or more beams of light 20, a second individual lens element 4 is secured relative to the optical axis while ensuring that the first individual lens element 2 remains substantially stationary. To align the second individual lens element 4 with the first individual lens element 2, the one or more beams of light 22 are directed through the aligned first individual lens element 2 and the second individual lens element 4. The second individual lens element 4 is manipulated so that the one or more beams of light 22 reflects back onto the source of the one or more beams of light 20. The reflection from the second individual lens element 4 will be coincident with the one or more beams of light 22 being reflected back from the first individual lens element 2 alone, prior to the placement of the second individual lens element 4 in the holder. After the second individual lens element 4 has been aligned, the first individual lens element 2 and the second individual lens element 4 are in a first aligned position.

In another embodiment of the alignment process, the one or more beams of light 22 will pass through the first individual lens element 2 and fall on the reference surface 29. Passing through arrow 27 represents the one or more beams of light 22 passing through the first individual lens element 2.

Once the first individual lens element 2 is manipulated so that the one or more beams of light 22 passes through the first individual lens element 2 and falls on reference surface 29, a second individual lens element 4 is secured relative to the optical axis while ensuring that the first individual lens element 2 remains substantially stationary. To align the second individual lens element 4 with the first individual lens element 2, the one or more beams of light 22 are directed through the aligned first individual lens element and the second individual lens element 4. The second individual lens element 4 is manipulated so that it is aligned and the one or more beams of light 22 are positioned at a predetermined point on reference surface 29. The predetermined point will be coincident with the one or more beams of light 22 when it was only directed through the first individual lens element 2 and not the second individual lens element 4. After the second individual lens element 4 has been aligned, the first individual lens element 2 and the second individual lens element 4 are in a first aligned position.

All lens elements can be aligned with either of the above described alignment processes. For clarity, the below description describes alignment with the first described alignment process, but this in no way excludes the use of the second alignment process.

Once the first individual lens element 2 and the second individual lens element 4 are in a first aligned position, the first individual lens element 2 and the second individual lens element 4 are adhered together. To adhere the first individual lens element 2 with the second individual lens element 4 to form a first combination element 12 doublet, a cement or other suitable adhesive may be used. Some examples of suitable adhesives include Norland 61 UV optical adhesive and Vitralit 6128 UV epoxy. If the first individual lens element 2 and second individual lens element 4 portions of the first combination element 12 are of different diameters, the first combination element can be edge ground to a single diameter with a tolerance of about (+0.00/−0.0 10 mm).

Once the first individual lens element 2 and the second individual lens element 4 are adhered to form first combination element 12, other individual lens elements may be aligned and added to the first combination element 12 doublet following by repeating the same steps stated above. Description of 3 individual lens elements forming a combination element is described below but each combination element can contain several individual lens elements depending on the optical qualities required by the imaging optic.

In another embodiment, after the first combination element 12 has been constructed, it is removed from its secured location. In another embodiment, where the first combination element 12 is adhered to one side of an aperture and only one individual lens element is adhered to the other side of the aperture, the first combination element 12 is left in the holder. Once the first combination element 12 has been constructed, it is left in the holder and an aperture 5 is placed in the holder. After aperture 5 is placed in the holder, a third individual lens element 6 is secured in the holder. The first combination element 12 is then adhered to one side of aperture 5 and the third individual lens element 6 is adhered to the other side of aperture 5. In this embodiment, the constructed imaging optic may be used in a suitable endoscope. The constructed imaging optic may also be constructed so that the surfaces of the imaging optic will have less than about 3 minutes tilt relative to the optical axis and less than about 0.005 mm de-center relative to the optical axis. In this embodiment, prior to adhering the third individual lens element 6 to aperture 5, aperture 5 may be filled with an adhesive or it may be left unfilled. The adhesive can be any suitable adhesive, including Vitralit 7256 and Norland Optical Adhesive 73. Filling the aperture with an adhesive can have several advantages, including decreasing effective thickness, decreasing air equivalent thickness and increasing image illumination, especially illumination around the edges of the image.

In the first embodiment, following removal of first combination element 12, the construction of a second combination element 14 can begin. To begin the construction of the second combination element 14, a third individual lens element 6 is placed on a holder. In one embodiment, the third individual lens element 6 can be first secured or adhered to a second rod which is also in the holder. The second rod can aid in handling the third individual lens element 6 and can provide support for the third individual lens element 6 throughout the formation of second combination element 14. The rod can be composed of glass or any other suitable material, including plastic.

Once the third individual lens element 6 is secured in the holder, the one or more beams of light 22 are passed through it. To align the third individual lens element 6, the third individual lens element 6 is manipulated so that the one or more beams of light 22 reflect back onto the source of the one or more beams of light 20. This manipulation can be done in any suitable manner, including a manual manipulation by a human user or an automated manipulation. If the manipulation is done in an automated fashion, a machine could be programmed to move each individual lens element until the one or more beams of light 22 reflects back onto the source of the one or more beams of light 20, getting closer to fully aligned until a predetermined error limit is reached. Once the third individual lens element 6 is manipulated so that the one or more beams of light 22 reflect back onto the source of the one or more beams of light 20, a fourth individual lens element 8 is placed in the holder while ensuring that the third individual lens element 6 remains substantially stationary.

To align the fourth individual lens element 8 with the third individual lens element 6, the one or more beams of light 22 are directed through the aligned third individual lens element 6 and the fourth individual lens element 8. Fourth individual lens element 8 is manipulated so that the one or more beams of light 22 reflects back onto the source of the one or more beams of light 20. The reflection from the fourth individual lens element 8 will be coincident with the one or more beams of light 22 being reflected back from the third individual lens element 6 alone, prior to the placement of the fourth individual lens element 8 in the holder. After the fourth individual lens element 8 has been manipulated, the third individual lens element 6 and the fourth individual lens element 8 are in a second aligned position.

Once the third individual lens element 6 and the fourth individual lens element 8 are in a second aligned position, the third individual lens element 6 and the fourth individual lens element 8 are adhered together, forming a first adhered group 13.

In one example, where three individual lens elements are adhered together to form second combination element 14, a fifth individual lens element 10 is placed in the holder along with the first adhered group 13, while keeping the first adhered group 13 substantially stationary.

Once the fifth individual lens element 10 is secured in the holder, the fifth individual lens element 10 is manipulated for alignment. To align the fifth individual lens element 10 with the previously aligned first adhered group 13, the one or more beams of light 22 are directed through the aligned first adhered group 13 and the fifth individual lens element 10. The fifth individual lens element 10 is manipulated so that the one or more beams of light 22 reflects back onto the source of the one or more beams of light 20. The reflection from the fifth individual lens element 10 will be coincident with the one or more beams of light 22 being reflected back from the first adhered group 13 alone, prior to the placement of the fifth individual lens element 10 in the holder. After the fifth individual lens element 5 has been aligned, the fifth individual lens element 10 and the first adhered group 13 are in a third aligned position.

Once the first adhered group 13 and the fifth individual lens element 10 are in a third aligned position, the first adhered group 13 and the fifth individual lens element 10 are adhered together forming second combination element 14.

If any of the third individual lens element 6, fourth individual lens element 8 and fifth individual lens element 10 are of a different diameter, the second combination element 14 can be edge ground to a single diameter to a tolerance of about (+0.00/−0.010 mm). Second combination element 14 can be edge ground to about the same diameter as first combination element 12.

Once third individual lens element 6, fourth individual lens element 8 and fifth individual lens element 10 are adhered to form second combination element 14, other individual lens elements may be aligned and added to the second combination element 14 triplet following the same steps stated above. Each combination element can contain several individual lens elements depending on the optical qualities required by the imaging optic. Each individual lens element is added as described above for the addition of the fifth individual lens element 10 to the first adhered group 13. For example, if a sixth individual lens element were to be added to the second combination element 14, it would be aligned with and adhered to the second combination element 14.

Once both the first combination element 12 and the second combination element 14 are completed, the first combination element 12, an aperture 5, and second combination element 14 are placed in the holder. Aperture 5 can have about the same size outer diameter as that of first combination element 12 and that of second combination element 14.

Figure 3:
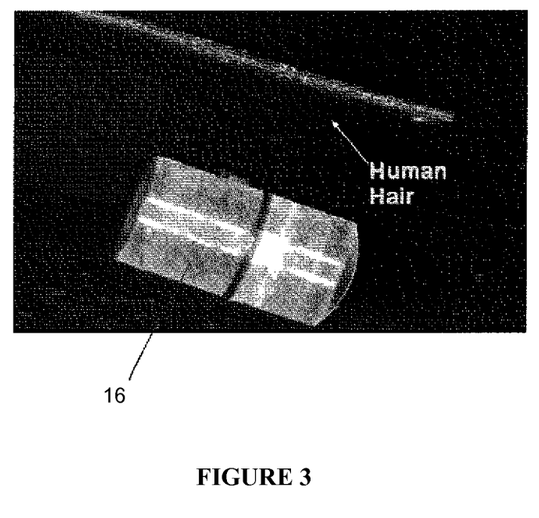
FIG. 3 is a lens assembly of one embodiment of the invention as compared to a human hair.
Figure 4:
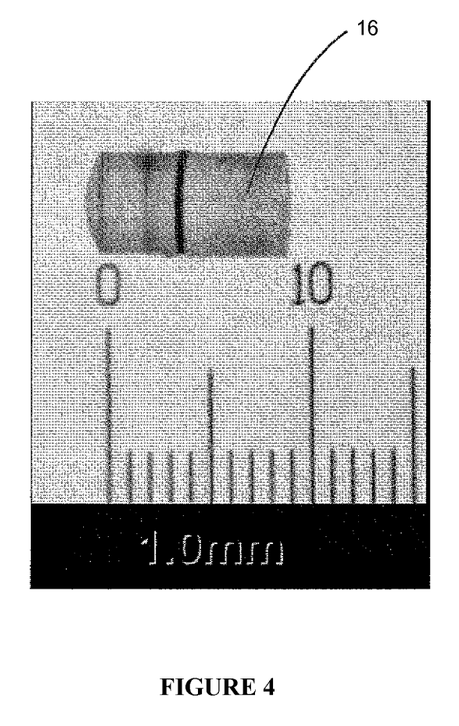
FIG. 4 is a lens assembly of one embodiment of the invention as compared to a portion of a ruler.

The first combination element 12 is then adhered to one side of the aperture 5. Aperture 5 can be any suitable thickness. In one embodiment, aperture 5 can be about 0.01 mm thick. After the first combination element 12 is adhered to one side of aperture 5, second combination element 14 is adhered to the other side of aperture 5, forming a lens assembly 16. In this embodiment, prior to adhering the second combination element 14 to aperture 5, aperture 5 may be filled with an adhesive or it may be left unfilled. The adhesive can be any suitable adhesive, including Vitralit 7256 and Norland Optical Adhesive 73. Filling the aperture with an adhesive can have several advantages, including decreasing effective thickness and increasing image illumination, especially around the edges of the image. FIG. 3 is one example of lens assembly 16 as compared to the size of a human hair. FIG. 4 is another example of the scale of lens assembly 16. The lens assembly 16 of FIG. 4 has a length of about 1 mm and a diameter of about 0.5 mm.

The lens assembly 16, constructed according to the above described method has good imaging quality, and can deliver a good image to an image capture device or image detector. The above described method makes a lens assembly, like lens assembly 16, in which the surfaces of the lens assembly can have less than about 3 minutes tilt and less than about 0.005 mm de-center. The method can also result in a yield loss between about 0% and about 5% as compared to a traditional method in creating a lens of the same dimensions and with the same specifications as those of the lens assembly 16, which would have a yield loss of between about 85% and about 90%. The term yield loss is used herein to describe the percentage of manufactured optics, which are not suitable for the designated imaging function because of produced image quality.

Figure 5:
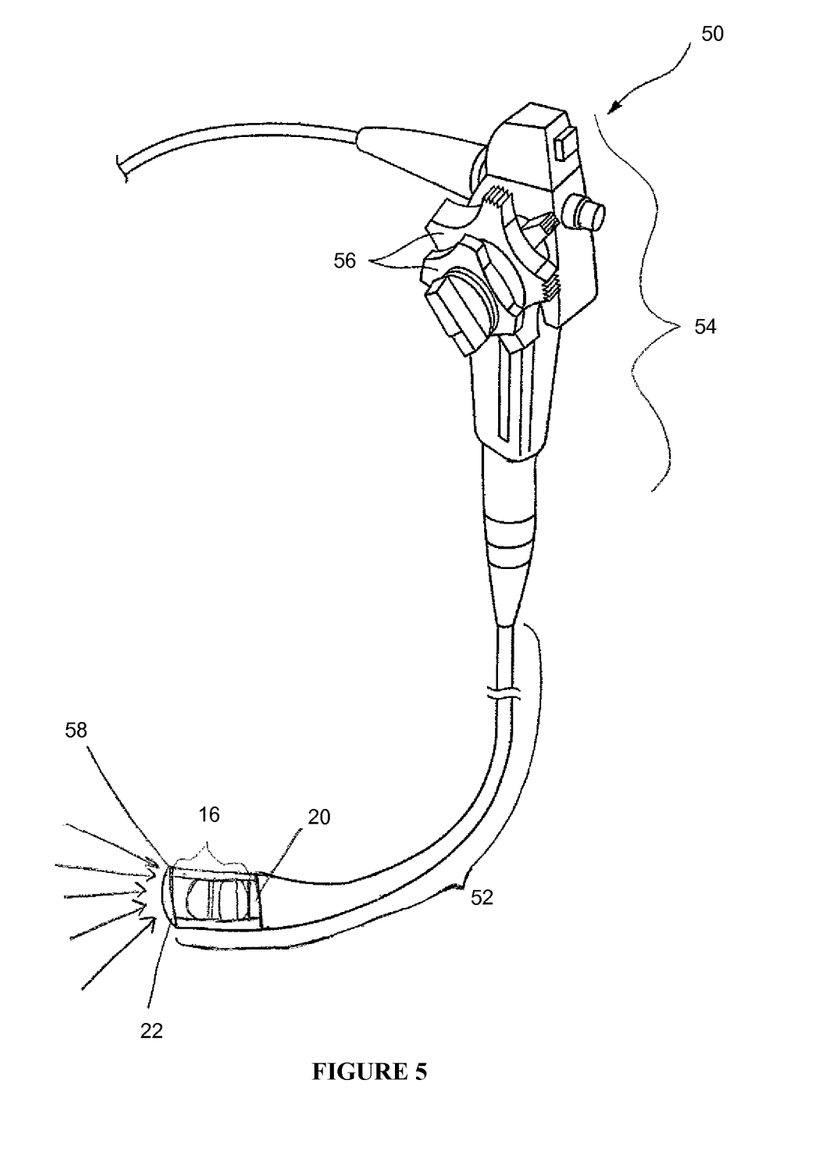
FIG. 5 is an exemplary endoscope which includes the inventive imaging lens assembly.

Lens assembly 16 can then be placed within a device along with an image capture device or image detector. Such device can be an endoscope. The endoscope can be a side view or front view endoscope. One embodiment of an endoscope which includes lens assembly 16 can be seen in FIG. 5. FIG. 5 shows an endoscope 50 which for descriptive purposes is a front view endoscope. Endoscope 50 has an operation portion 54 which includes two bending operation arms 54 for performing bending operations during use of the endoscope. Operation portion 54 is at the proximal end of endoscope 50 and remains in control of an administrator during an endoscope procedure. Endoscope 50 also includes an elongated insertion portion 52 which is inserted into a patient during an endoscope procedure. In this exemplary endoscope, only imaging capabilities are shown but the endoscope could also include fluid delivery and removal and the use of medical instruments in the region surrounding the distal end 58 of endoscope 50. Shown in the distal end 58 is lens assembly 16, an image capture device 20 and a window 22 which separates lens assembly 16 from the environment outside of the distal end 58. Window 22 can be of any suitable shape, including plano-plano, plano-convex, plano-concave, concave-convex and variations of these shapes. The arrows to the left of window 22 represent the viewing area captured by lens assembly 16.

The lens assembly 16 can include a filter for desired applications and can be chosen according to the use. The filter can be included in any suitable position, including the furthest surface from the image detector or image capture device.

The above described method of creating the lens assembly 16 can be conducted by a user or it may be automated. During the method of aligning and adhering individual lens elements and adhering combination elements to an aperture, the manipulation of the pieces may be made by a human user or a robotic user, the robotic user being programmed to manipulate pieces so that they are properly aligned and adhered as described above.

While the present invention has been described in particular embodiments, it should be appreciated that the present invention should not be construed as limited by such embodiments, but rather construed according to the below claims.

EXAMPLE 1

Figure 6:
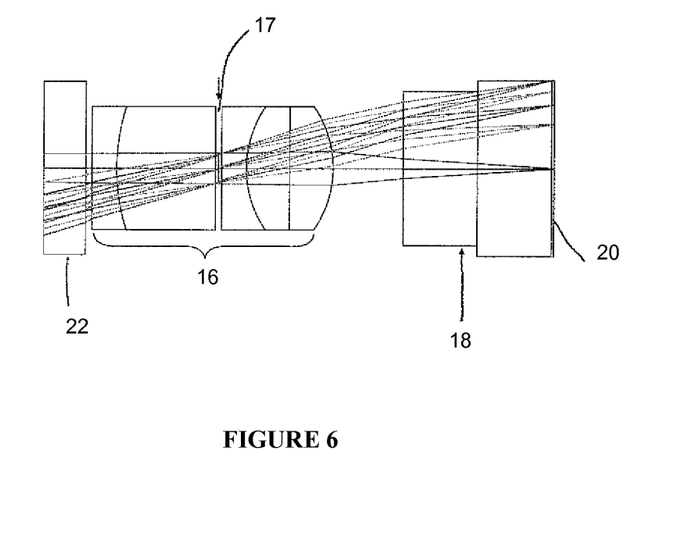
FIG. 6 is a ray diagram produced by one embodiment of a lens assembly.

A lens assembly, similar to lens assembly 16, is shown in FIG. 6, which is a ray diagram. The prescription of each element can be seen below. The listed materials (sizes, shapes optical characteristics) are provided by way of example and not to limit the scope or spirit of the invention to that which is specifically illustrated in the example.

| Surface | Radius | Thickness | Glass | Diameter |
|---------|--------|-----------|-------|----------|
| OBJ | Infinity | 3.900 | | 5.370 |
| 1 | Infinity | 0.170 | SAPPHIRE | 0.700 |
| 2 | Infinity | 0.025 | | 0.500 |
| 3 | Infinity | 0.100 | S-LAH58 | 0.500 |
| 4 | 0.8159 | 0.400 | S-NPH2 | 0.500 |
| 5 | Infinity | 0.000 | | 0.500 |
| 6 | Infinity | 0.013 | | 0.124 |
| STO | Infinity | 0.013 | | 0.124 |
| 8 | Infinity | 0.000 | | 0.124 |
| 9 | Infinity | 0.100 | S-NPH2 | 0.124 |
| 10 | 0.44 | 0.175 | S-LAH52 | 0.500 |
| 11 | Infinity | 0.175 | S-LAH52 | 0.301 |
| 12 | −0.44 | 0.000 | | 0.500 |
| 13 | Infinity | 0.285 | | 0.409 |
| 14 | Infinity | 0.300 | N-BK7 | 0.536 |
| 15 | Infinity | 0.300 | N-BK7 | 0.623 |
| 16 | Infinity | 0.010 | NOA61 | 0.710 |
| IMA | Infinity | | | 0.714 |

Thickness and diameter are listed in millimeters. The listing of surfaces begins on the left hand side of FIG. 6 and proceeds to the right of FIG. 6.

An unfolded prism 18 is shown as well as an image capture device 20. Image capture device 20 can be any suitable device, including a Charge Coupled Device (CCD). A window 22 is also shown. Window 22 can be used to separate the lens assembly 16, prism 18 and image capture device 20 from the environment, including an environment surrounding an endoscope. Window 22 can be any suitable material, including plastic, glass or sapphire glass. An aperture 17 can be seen in the structure of the lens assembly 16. Lens assembly 16 has a high degree of alignment of each of the individual lens elements, with the surfaces of lens assembly 16 having less than about 3 minutes tilt and less than about 0.005 mm decenter, including the effect of tolerances.

What is claimed is:

1. A method of making an imaging optic, the method comprising:
   (a) securing a first individual lens element in a holder;
   (b) directing one or more beams of light through the first individual lens element subsequent to the step of securing the first individual lens element;
   (c) aligning the first individual lens element with the optical axis of the one or more beams of light subsequent to the step of directing one or more beams of light through the first individual lens element;
   (d) securing a second individual lens element in the holder subsequent to the step of aligning the first individual lens element;
   (e) directing the one or more beams of light through the first individual lens element and the second individual lens element subsequent to the step of securing the second individual lens element;
   (f) aligning the one or more beams of light from the first individual lens element with the one or more beams of light from the second individual lens element, placing the first individual lens element and the second individual lens element in a first aligned position subsequent to the step of directing the one or more beams of light through the first individual lens element and the second individual lens element; and
   (g) adhering the first individual lens element to the second individual lens element in the first aligned position, forming a first combination element subsequent to the step of aligning the one or more beams of light, wherein the surfaces of the imaging optic have less than about 3 minutes tilt relative to the optical axis and less than about 0.005 mm de-center relative to the optical axis.

2. The method of claim 1, further comprising:
   (a) placing an aperture in the holder;
   (b) securing a third individual lens element in the holder;
   (c) adhering the first combination element to one side of the aperture; and
   (d) adhering the third individual lens element to the other side of the aperture.

3. The method of claim 2, wherein the aperture is filled with an adhesive.

4. The method of claim 1, wherein the first individual lens element and the second individual lens element are placed in the first aligned position by aligning the one or more beams of light reflected back from the first individual lens element with the one or more beams of light reflected back from the second individual lens element.

5. The method of claim 1, wherein the first individual lens element and the second individual lens element are placed in the first aligned position by aligning the one or more beams of light passing through the first individual lens element with the one or more beams of light passing through the second individual lens element.

6. The method of claim 1, further comprising:
   (a) removing the first combination element from the holder;
   (b) securing a third individual lens element in a holder;
   (c) directing one or more beams of light through the third individual lens element;
   (d) aligning the third individual lens element with the optical axis of the one or more beams of light;
   (e) securing a fourth individual lens element in the holder;
   (f) directing the one or more beams of light through the third individual lens element and the fourth individual lens element;
   (g) aligning the one or more beams of light from the third individual lens element with the one or more beams of light from the fourth individual lens element, placing the third individual lens element and the fourth individual lens elements in a second aligned position;
   (h) adhering the third individual lens element to the fourth individual lens element in the second aligned position;
   (i) placing the first combination element and an aperture in the holder;
   (j) adhering the first combination element to one side of the aperture; and
   (k) adhering the second combination element to the other side of the aperture.

7. The method of claim 6, further comprising a step between steps (h) and (i), the step comprising securing a fifth individual lens element in the holder, directing the one or more beams of light through the third individual lens element, fourth individual lens element and fifth individual lens element, aligning the one or more beams of light directed through the third individual lens element and fourth individual lens element with the one or more beams of light from the fifth individual lens element, placing the fifth individual lens element, third individual lens element and fourth individual lens elements in a third aligned position, and adhering the fifth individual lens element to the fourth individual lens element in the third aligned position, forming a second combination element.

8. The method of claim 6, wherein the third individual lens element and the fourth individual lens element are placed in the second aligned position by aligning the one or more beams of light reflected back from the third individual lens element with the one or more beams of light reflected back from the fourth individual lens element.

9. The method of claim 6, wherein the third individual lens element and the fourth individual lens element are placed in the second aligned position by aligning the one or more beams of light passing through the third individual lens element with the one or more beams of light passing through the fourth individual lens element.

10. The method of claim 6, wherein the aperture is filled with an adhesive.

11. The method of claim 1, further comprising a step following step (g), the step comprising securing a sixth individual lens element in the holder, directing the one or more beams of light through the first individual lens element, the second individual lens element and sixth individual lens element, aligning the one or more beams of light from the first individual lens element and second individual lens element with the one or more beams of light from the sixth individual lens element, placing the sixth individual lens element, first individual lens element and second individual lens elements in a fourth aligned position, and adhering the sixth individual lens element to the second individual lens element in the fourth aligned position.

12. The method of claim 1, wherein the individual lens elements are adhered to form combination elements by an adhesive.

13. The method of claim 12, wherein the adhesive is Norland 61 UV optical adhesive.

14. The method of claim 1, wherein the combination elements are edge ground prior to adhering to the aperture.

15. The method of claim 1, wherein the individual lens elements are glass.

16. The method of claim 1, wherein the individual lens elements are plastic.

17. The method of claim 1, wherein each individual lens element has at least one flat surface.

18. The method of claim 1, wherein each individual lens element has at least one curved surface.

19. The method of claim 1, wherein the first and second combination elements are adhered to the aperture with Vitralit 6128 UV epoxy.

20. The method of claim 1, wherein the imaging optic has a diameter of about 0.5 mm.

21. The method of claim 1, wherein the first and second individual lens elements are secured in a holder.

22. The method of claim 1, wherein the one or more beams of light create an image.

23. The method of claim 1, wherein the one or more beams of light are from a laser source.

24. The method of claim 1, wherein each of the lens elements is a planoconvex lens element or a planoconcave lens element.

25. The method of claim 1, wherein the imaging optic has a length of 1 mm or less.

26. The method of claim 1, wherein the imaging optic has a diameter of 0.5 mm or less.

* * * * *